United States Patent [19]

Denecke

[11] 4,227,126
[45] Oct. 7, 1980

[54] SHAFT ROTATION INTERLOCK SYSTEM FOR FILM EDITING TABLES AND THE LIKE

[76] Inventor: Henry M. Denecke, 629 W. Knoll Dr., Los Angeles, Calif. 90069

[21] Appl. No.: 879,280

[22] Filed: Feb. 21, 1978

[51] Int. Cl.$^3$ .................... H02P 5/46; G05D 13/62; G03B 31/04

[52] U.S. Cl. ........................ 318/55; 318/78; 318/625

[58] Field of Search .............. 318/41, 43, 77, 310, 318/318, 314, 315, 319, 342, 66, 68–71, 326, 327, 625, 54–58, 65, 78; 353/26 R

[56] References Cited

U.S. PATENT DOCUMENTS

| | | | |
|---|---|---|---|
| 3,118,097 | 1/1964 | Hettler | 318/70 |
| 3,543,112 | 11/1970 | Richmond | 318/310 |
| 3,906,327 | 9/1975 | O'Callaghan et al. | 318/625 |
| 3,932,794 | 1/1976 | Iwako | 318/318 |

FOREIGN PATENT DOCUMENTS

2426532 4/1975 Fed. Rep. of Germany .
1148437 4/1969 United Kingdom .

OTHER PUBLICATIONS

Kessler, G., "Digitale Regelung der Relation Zweier Drehzahlen", *Elektrotechnisce Zeitschrift*, Ausgabe A, vol. 82, 8-28-61, pp. 576-578.

Fritzsche, W., "Digitale Regelung Von Drehzahlverhaltnissen", *AEG Mitteilungen*, vol. 51, Mar./Apr. 1961, p. 144.

Dessner et al., "Digital Control Applications", Iron & Steel Engineer, vol. 48, No. 10, pp. 72-80.

*Primary Examiner*—David Smith, Jr.
*Assistant Examiner*—Michael K. Mutter
*Attorney, Agent, or Firm*—I. Morley Drucker

[57] ABSTRACT

There is disclosed apparatus suitable for use in conjunction with film editing tables or other devices requiring precise control over shaft rotation speed, that is, apparatus for interlocking two or more shaft rotating systems to rotate one or more slave shafts in precise speed synchronism with one remote master shaft. For each slave shaft to be controlled, there is provided a differential amplifier connected in a velocity servo loop designed to force the slave shaft to rotate in precise speed synchronism with a remote or line master shaft. The primary feedback loop comprises means for generating trains of pulses having a characteristic representative of each of the rotational speeds and for deriving from these pulse trains analog voltages which are applied to a differential amplifier to produce an error signal to be driven to zero for controlling the speed of the slave shaft. In addition to the primary feedback loop thus maintaining the basic speed synchronism, there is also provided a secondary feedback loop which includes means for deriving a third analog voltage proportional to the digitally measured difference between the representative characteristics of the first and second trains of digital pulses. This third analog voltage is combined with one of the first or second analog voltages to form a composite input to the differential amplifier. The third analog voltage is derived through a secondary feedback loop parallel to the primary loop and serves to maintain the shaft speed in precisely interlocked synchronism.

23 Claims, 11 Drawing Figures

SHAFT ROTATION INTERLOCK SYSTEM FOR FILM EDITING TABLES AND THE LIKE

BACKGROUND OF THE INVENTION

1. Field of the Invention

The primary application of this interlock system is to interlock two or more shafts on film editing tables. It is now possible to interlock drive motors of these tables at very high expense and using very complex and more costly electronics. With the present invention, the system can be greatly simplified and can be produced far less expensively while improving precision. The system derives information from editing Table I and feeds the information to Table 2. As the picture and sound from Table 1 move, Table 2 will follow. This aids in synchronizing several picture and sound tracks.

Another film application is to lock together film reproducers so that a final mix can be performed. Sound tracks which have been recorded on sprocketed magnetic film are edited and aligned with the film. These tracks must be played back in interlock or synchronism to mix the film. The audio from the sound tracks are fed into an audio mixer and the film is then viewed. This enables the mixer to adjust audio levels so that they match with the picture. An example would be having a door close. If it were out of synchronism, or too loud or too soft, it would be very obvious to the audience. Since many elements are used in making a film, each element must be worked with separately. Thus, the music, sound effect, dialogue, and narration are derived from separate tracks and are synchronously mixed. To maintain synchronism, interlocked motors are used to drive the film.

Other applications include machine tools that are computer controlled. This interlock system can follow signal pulse lines very accurately with very little overshoot. Similar applications exist in robotics where several motors must be controlled with a simple interlock system. Mechanical arms to lift and maneuver heavy objects with precise accuracy and aircraft servos where lightweight accurate stable servos are needed are other exemplary applications.

In each of these applications the interlock package forming the present invention is used to lock together two or more servo systems. The unit takes information from the line or remote encoder which is representative of the speed of rotation of the remote or master shaft and compares it to the local encoder output which is representative of the speed of rotation of the local or slave shaft, to derive a control error signal. When the difference is zero, the two shafts are, of course, in synchronism thus giving an accurate interlock between the systems. In practice, however, imperfection of components, and drift with time requires means for achieving greater precision than heretofore possible.

It is an object of the present invention to provide such a system having such means for affording greater precision of synchronous shaft control at reduced cost.

Prior Art

Typical early efforts at implementation of digital servo mechanism are illustrated, for example, by U.S. Pat. No. 2,932,471 to W. L. Exner, et al. This system provides a digitally computed external control correction to a basic analog loop.

U.S. Pat. No. 3,064,173 issued Nov. 13, 1962 to S. Breen et al. relates to a speed slaving method and apparatus for controlling shaft rotation in such processes as paper making and the like. The system disclosed therein has only one (1) basic servo mechanism feedback loop which is not bi-directional and is capable of providing only a gross or basic interlock between the shafts. No correction for precision to the extent necessary to control a single exposure or frame of a motion picture film is disclosed.

U.S. Pat. No. 3,345,008 issued Oct. 3, 1967 to Jacoby relates to a tape reel servo mechanism for controlling magnetic tape drive apparatus. The invention pertains primarily to the inclusion of a nonlinear circuit arrangement in the rate damping loop of the reels and cannot afford the degree of accuracy afforded by the present invention. No digital techniques are used therein.

U.S. Pat. No. 3,500,190 issued Mar. 10, 1970 to Michon pertains to a vehicle velocity measuring system employing an adjustable width pulse generating system. Again, the broad concept of servo control is discussed but the precise circuitry of the present invention affording the required degree of precision is not contemplated or suggested. Similar comments apply to U.S. Pat. No. 3,565,521 issued Feb. 23, 1971 to L. W. Butler et al. and to U.S. Pat. No. 3,953,776 issued Apr. 27, 1976 to Wolf. None of the foregoing patents are directed to the problem solved by the present invention, none of them disclose a true bi-directional servo system and none of them disclose the apparatus disclosed and claimed herein.

SUMMARY OF THE INVENTION

The DC servo interlock package of the present invention is used to lock together two (2) or more servo motors. The unit takes information from the line or remote encoder output which is representative of the speed of rotation of the remote or master servo controlled shaft, and compares the line information to the local servo motor shaft encoder output. Each of the encoder outputs is in the form of trains of digital pulses respectively. The interlock electronics consist of seven (7) basic sections, as follows:

First, the differential input circuitry which is used to receive line and servo motor pulses and makes them noise-free and the line drivers to drive a slave motor system.

Second, pulse multipliers and direction sensors to separate the quadrature output of the dual channel encoder into two (2) pulse lines.

Third, pulse synchronizer circuitry to synchronize the random incoming pulses to the system clock.

Fourth, multi-phase clock circuitry to drive the synchronizers. Fifth, digital mixer circuitry to mix the various pulse rates and drive an up/down counter with valid input pulses thereto.

Sixth, the up/down counter circuit to digitally measure the difference between its input pulse train frequencies.

Seventh, bi-polar/directional frequency-to-voltage converters used as DC tachometers to drive the servo amplifier.

The line pulses received in quadrature from the remote driver are fed into the line receivers. These pulses are then decoded and fed into separate count lines, the up count line and the down count line. The count lines are then synchronized to Phase 1 of the multi-phase clock. The synchronizer is used to produce one and only one pulse of a constant width per input pulse related to the clock frequency. The shaft encoder output on the motor to be driven (that is, the motor for the slave shaft) is fed into a similar decoder synchronizer, the difference being that the synchronizer is driven by Phase 2 of the system clock.

The outputs are then mixed in Exclusive OR gates. The up output of the line is mixed with the down output of the servo motor encoder and the down output of the line is mixed with the up output of the servo motor encoder. These mixed outputs are then fed to a positive or negative edge detector to eliminate any overlapping parts of pulses. No two (2) pulses directly coincide due to the multi-phase clock. In this manner, many frequencies can be added or subtracted, depending on the number of phases of the clock and synchronizers. The output from the edge detector is then a valid input to the up/down counter. The output of the up/down counter then goes to a digital-to-analog converter which produces an offset voltage when the pulse rates are not equal. This offset voltage is used as the error signal in the secondary precision maintaining the feedback loop, which is connected in parallel with the primary analog feedback loop.

The analog section of the interlock takes the contant width pulses and creates a positive or negative pulse depending on the direction of rotation. These pulses are then fed into an integrator which creates a DC voltage related to the speed and direction of the line or servo encoder. These, then, are the frequency-to-voltage plus sign converters or "electronic tachometers." The output voltage is trimmed by changing the system clock frequency. The output of the line tachometer feeds the servo motor tachometer and when both directions of rotation and pulse rates are the same, the output is close to zero. This primary feedback loop creates a basic interlock between the remote and the local motor systems. The output of the digital-to-analog converter discussed above which has its input derived from the output of the up/down counter is then fed into the line integrator to correct any slight variations in the tachometer outputs, thus giving a secondary feedback loop in parallel with the primary loop which gives accurate interlock. Amplifiers are used in pairs, the outputs of one looking into the inverting input of the second, and the gain for the second is set at unity. This tends to cancel any DC drift and makes the system temperature stable.

BRIEF DESCRIPTION OF THE DRAWINGS

These and other features, advantages and objects will be more fully apparent from the detailed description of the invention given below taken in connection with the accompanying drawings wherein like reference characters refer to like parts throughout and in which.

DETAILED DESCRIPTION OF THE DRAWINGS

Figure 1:
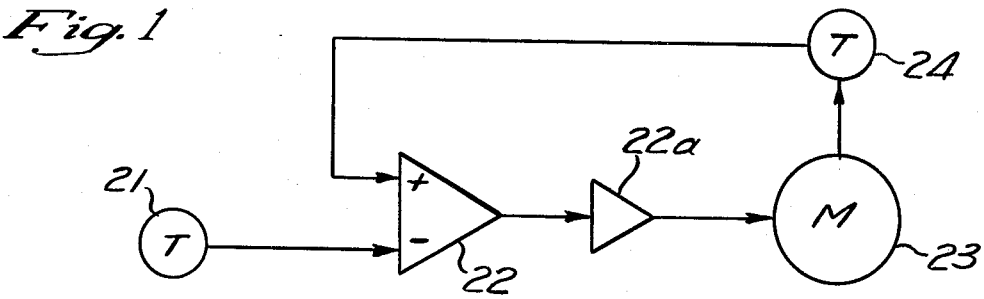
FIG. 1 is a generalized block diagram, illustrating the basic principles of operation of velocity servo systems.

FIG. 1 is a block diagram illustrating the basic principles of operation of an analog velocity servo system. If the tachometer 21 is rotated in a clockwise direction, at a predetermined RPM, such as 100 RPM, it generates a predetermined output, such as +1 volt. Polarities can, of course, be reversed if done consistently throughout. The voltage generated is applied to the negative input terminal of the differential amplifier 22. It is assumed that amplifier 22 is a very high gain amplifier so that it will provide sufficient voltage to power amplifier 22a to drive the servo motor 23 at a speed higher than 100 RPM (that is, higher than the speed of rotation of tachometer 21) if no feedback is present. However, feedback is present in the form of a tachometer 24, driven by motor 23, which has its output connected to the second or positive terminal of differential amplifier 22. As motor 23 turns, it mechanically rotates tachometer 24 clockwise, that is, in the same rotational direction as that of tachometer 21 initially driving motor 23. Since tachometer 24 is similar to tachometer 21, it will generate a voltage. The voltage from tachometer 24 is fed into the positive input terminal of differential amplifier 22. As the tachometer 24 voltage approaches +1 volt, the output voltage of differential amplifier 22 will stabilize to a voltage sufficient to drive motor 23 at close to the same speed as the tachometer 21. That is to say, the servo system will become stabilized at a point at which the error signal or difference between the two inputs to differential amplifier 22 approaches zero. Tachometer 21 will lead the system and tachometer 24 will follow, thus creating a basic or rough interlock between the two tachometers. This part of the interlock system is stable and bi-directional, but lacks accuracy. That is to say, if the tachometer 21 is rotated clockwise, motor 23 and tachometer 24 will likewise be rotated clockwise. But if the tachometer 21 is rotated counterclockwise, the motor 23 and tachometer 24 will likewise be rotated counter-clockwise. However, in neither case will there be a high degree of precision or accuracy in the synchronism of speed between the two tachometers 21 and 24 by virtue of imperfections in the systems components, lack of perfect match, friction and heat losses, temperature instabilities, drift and the like.

Figure 2:
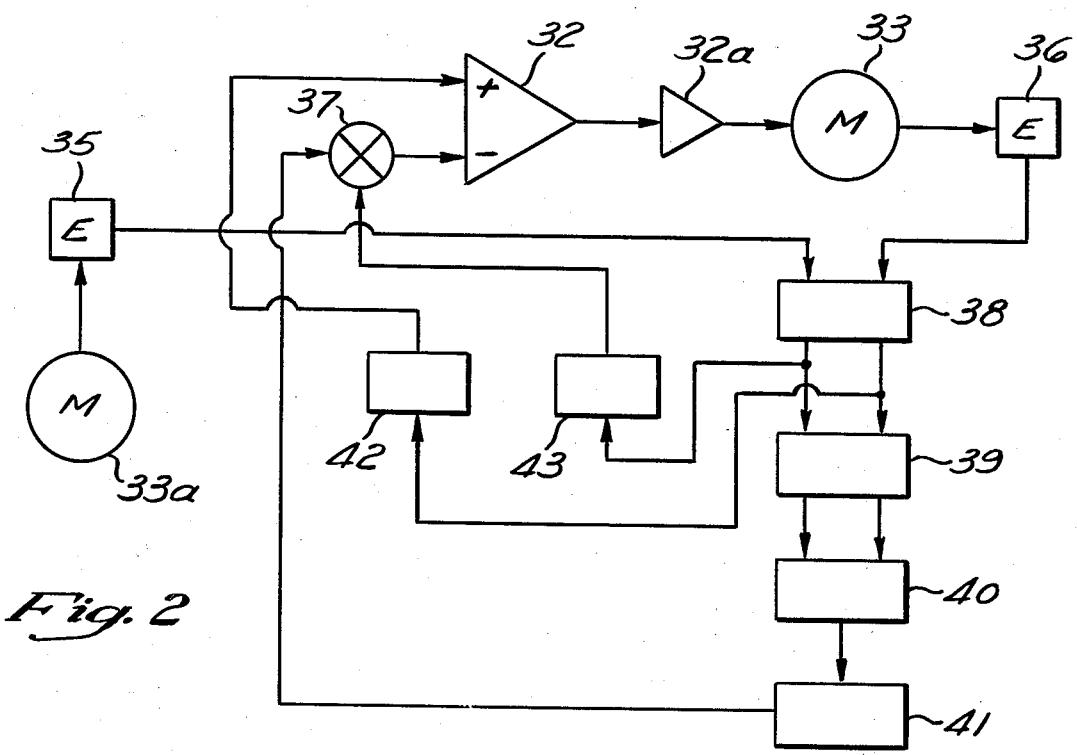
FIG. 2 is a system block diagram, illustrating the principles of the present invention as applied to a system of the type shown in FIG. 1.

In FIG. 2, there is shown a block diagram of the system of the present invention which adds to the principles of operation discussed in connection with FIG. 1 circuitry for precisely controlling the interlock or synchronization. In FIG. 2, the motor 33 corresponds to the motor 23 of FIG. 1 and is driven by a differential amplifier 32 and power amplifier 32a similar to the differential 22 and power amplifier 22a, discussed in connection with FIG. 1. Slave motor 33 drives shaft encoder 36 and a master or remote motor 33a drives its shaft encoder 35. However, the tachometers 21 and 24 of FIG. 1 are replaced in FIG. 2 by electronic tachometers that takes the pulse rates from shaft encoders 35 and 36 to create tracking DC voltages. These electronic tachometers are respectively, the bipolar frequency to voltage converters 42 and 43.

The shaft encoders 35 and 36 may, for example, be rotating discs having one or more aperatures therein and mechanically driven, respectively, by the remote line servo motor which provides the master speed control and by the local slave motor 33 to be controlled in synchronism with the master. When these motors rotate the disc, a beam of light is permitted to pass through the aperture as the aperture rotates past a light source. A photo-detector positioned to receive the light beam then generates as its output a train of pulses having a frequency which is proportional to the speed of rotation of the disc and hence, of the shaft driving it. Such encoders are, per se, well known in the art and do not form a part of the present invention.

When the shaft encoder 35 turns, it generates as described above, a string of pulses which are fed into pulse synchronizer 38 (which includes quadrature detectors) where there are decoded, synchronized and fed to the electronic tachometers 42 and 43 and also in parallel to the digital mixer 39. In mixer 39, the pulses are combined, made valid count pulses, suitable as acceptable inputs to the up/down counter 40 and are routed to the proper inputs of counter 40. The output of the up/down counter 40 (which is the difference between its input counts) is fed to the digital to analog converter 41 which has its output connected to the analog mixer 37. The other input to mixer 37 is the output of the electronic tachometer 43 and the output of mixer 37 is connected to the negative input of differential amplifier 32. The positive input to differential amplifier 32 is derived from the output of the electronic tachometer 42.

It will be noted that in FIG. 2 there is a two-branch first order feedback loop in the servo mechanism, which operates very much in accordance with the principles described in connection with FIG. 1. This two-branch first order loop, starting with the differential amplifier 32 and motor 33 driven thereby, includes the shaft encoder 36 which provides a train of pulses having a frequency proportional to and representative of the speed of rotation of motor 33. These pulses are synchronized in synchronizer-detector 38 with pulses similarly derived by encoder 35, the frequency of which is representative of the speed of rotation of the master or remote motor 33a driving encoder 35. The two branches of the first order loop may thus be seen to comprise encoder 35, the output of which is fed through synchronizer 38 to the electronic tachometer 43 the output of which is, in turn, fed through mixer 37 as one input to differential amplifier 32. The second branch, of course, comprises the pulse train output of shaft encoder 36 which is fed through synchronizer 38 and thence through the electronic tachometer 42, the output of which is applied as a second input to differential amplifier 32. These two branches alone would function very much in the manner of the system shown in FIG. 1 to stabilize the speed of motor 33 basically or roughly at the speed of motor 33a driving encoder 35.

However, a second order loop parallel to the above described first order loop is also provided to maintain a digitally controlled precise interlock between the two (2) motor speeds. The level of precision can be easily held to no more than plus or minus 10 pulses at any rpm depending on amplifier gains and electronic tachometer precision. Since the number of pulses per rpm can be almost arbitrarily selected by changing disc apertures, and since amplifier gain can be changed or varied, precision as good as +1 pulse can be obtained. In the exemplary system there are 100 pulses per film frame so that better than single frame control is easily achieved.

The second order loop noted above comprises the digital mixer 39 which also receives the output of the encoders 35 and 36 which mixes these outputs before applying them to the up/down counter 40 to determine the difference between their frequencies. The output of the up/down counter 40, which is proportional to this difference is applied to the digital to analog converter 41, the output of which is applied through mixer 37 to the negative input terminal of differential amplifier 32. It will, of course, be understood that polarities could be reversed and mixed 37 could be placed in the other line so as to apply this to the positive input terminal of differential amplifier 32. In either case, the output of the digital to analog converter 41 will only be zero when the difference between the frequencies of the pulse train inputs to digital mixer 39 is zero, that is, when the two (2) motor speeds are exactly alike. If any difference exists, it is digitally measured and that measurement is used to generate a second order correction voltage to be applied in the analog servo loop.

As shown in the drawings, if the shaft encoder 35 turns clockwise, it feeds pulses to the synchronizer 38 which feeds up pulses to the electronic tachometer 42 and mixer 39. Mixer 39 feeds the up line of the counter 40 thereby driving the digital to analog converter 41 to a positive output. This creates a negative output voltage on amplifier 32, turning motor 33 in a clockwise direction. Thus, shaft encoder 36 creates pulses that are synchronized, fed to electronic tachometer 42 and mixer 39. Mixer 39 then feeds the down line of counter 40, driving the digital to analog converter 41 negative in its output. This action equalizes the error between shaft rotations. Accuracy as noted above is a function of the number of pulses per revolution of the shaft encoders (which is easily varied to meet system design needs), number of bits in the counter, gain of the servo amplifier, and of the accuracy of the digital to analog converter. When the pulse rates of encoders 35 and 36 are equal, there is no change in the output of the digital to analog converter 41. The system is then stable. When the system is in a stable condition, the tracking error is quite small. This means that close interlock is held from stop to the highest speed of the system.

It will be noticed that the servo system of FIG. 2, which is intended to interlock the speed of rotation of slave motor 33 with that of the master motor 33a includes encoders 35 and 36 for deriving digital signal pulse trains which are respectively representative of the speed of rotation of the two motors. The speeds are conveniently represented by the frequencies of occurrence of these pulses which may be generated by any conventional means well known in the art. The system further includes as its essential feature, both first and second order feedback loops for utilizing the differential amplifier 32 to control the speed of motor 33. In the first order loop, the trains of digital pulses are each directly converted to an analog voltage which is suitable for use as an input to the differential amplifier 32 and the amplifier 32 does the signal processing by way of obtaining the difference between these analog signals to derive an error signal. This first order loop includes the pulse synchronizer 38 from which pulses from the encoder 35 are passed through the electronic tachometer 43 and thence via mixer 37 to the negative input of differential amplifier 32, as a first branch. The second branch of the first order loop takes the pulse train from encoder 36 and feeds it through the electronic tachometer 42 to the other or positive input of the differential amplifier 32. This establishes a basic or gross interlock between the speeds of rotation of motors 33 and 35(a). However, a second order loop is connected in parallel with this loop and branches off from pulse synchronizer 38 to go through digital mixer 39 and the up/down counter 40 in order to digitally determine the difference between the speeds of rotation of the two (2) motors. Notice that this function is a second order digital determination of the error signal which is being determined in an analog manner by the differential amplifier in the first order loop. That is to say, the differential amplifier 32 is attempting to reduce the error signal at its output to zero, even in the absence of the second order loop. The digital determination of the difference between these frequencies is a simultaneous measure of the extent to which this has not been accomplished or the extent of residual error still remaining. The digital to analog converter 41 takes the output of the up/down counter 40 and converts it to an analog voltage which may be applied through mixer 37 to add to the negative input voltage of the differential amplifier 32 to further reduce the error in the system. By this means, it is possible to achieve a far higher degree of precision of control than has heretofore been possible. This is believed to be due, at least in part, to the fact that the smaller residual tape error in the second error loop is being measured digitally by very precise and sensitive circuitry rather than by purely analog means. It follows that, as noted in detail above, the degree of precision can be made almost as great as desired in view of the very high degree of precision obtainable with digital techniques.

Figure 3:
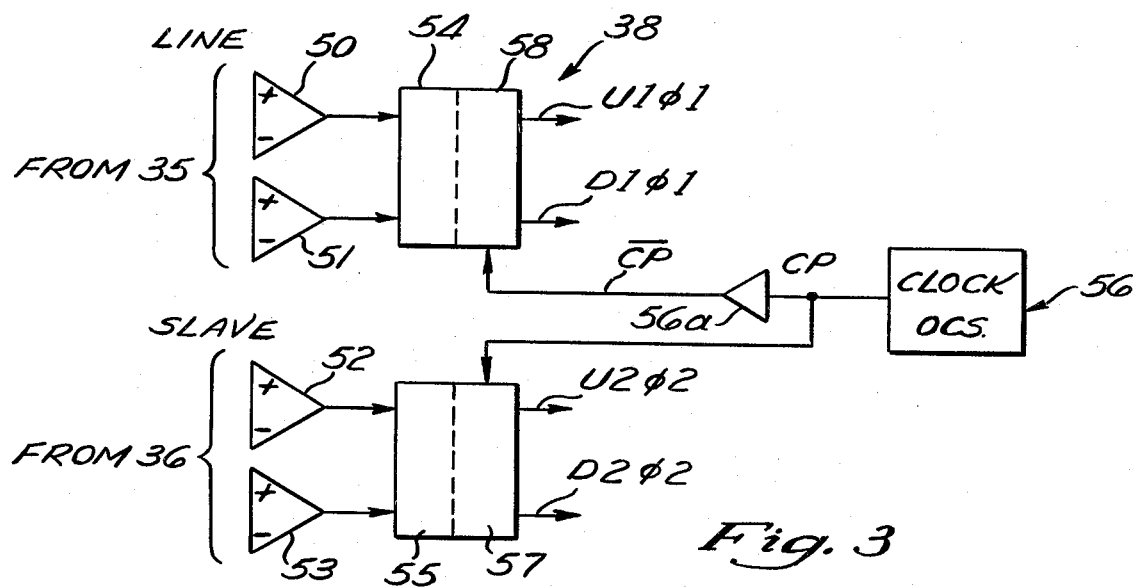
FIGS. 3 and 4 are detailed block diagrams, each illustrating circuit details of one of the blocks shown in FIG. 2.
Figure 4:
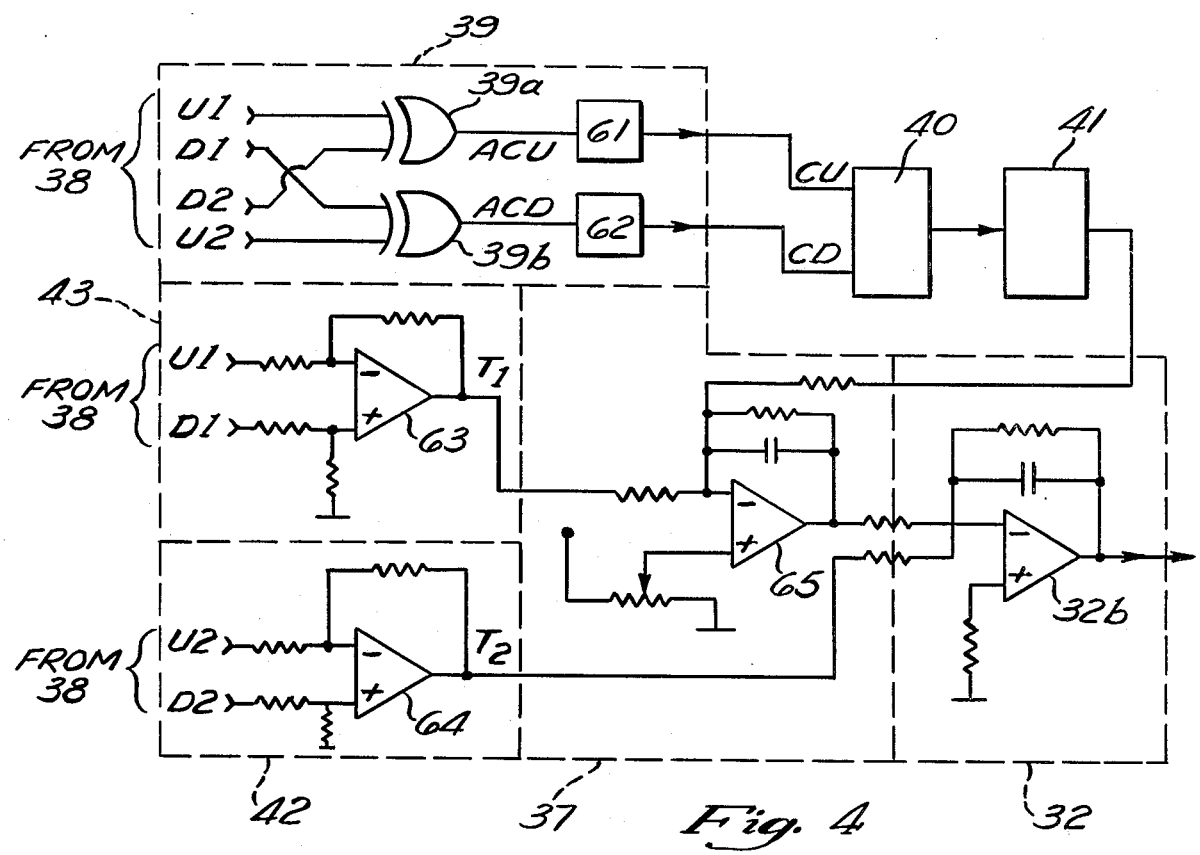

FIGS. 3 and 4 are, respectively, more detailed block diagrams of the synchronizer-detector 38 and (in FIG. 4), the digital mixer 39 and that portion of the system comprising the up/down counter 40, the digital to analog converter 41, the electronic tachometers 42, 43 and the mixer 37. From FIG. 3, it will be noted that the synchronizer 38 consists of differential line receivers 50, 51 and 52, 53, which receiver signals from shaft encoder 35 and 36 to make them noise free. Then the pulses are decoded and synchronized to the two phase clock 56 by the decoder-synchronizers 54-58 and 55-57. The synchronizer generates one and only one pulse per input pulse synchronized to the clock as seen in the detailed pulse diagram of FIG. 8. In FIG. 3, blocks 54 and 55 are conventional, and blocks 58 and 57 are synchronizers with direction sensing. The pulse output from the encoder 35 for the remote line motor 33(a) is applied to the differential line receivers 50 and 51, whereas the similar pulse output from the local or slave motor encoder 36 is applied to the differential line receivers 52 and 53. Pulses are received differentially from the lines and fed to the synchronizer-quadrature detector 38, where they are sorted out into two lines, the up count line and the down count line, U1, D1 for quad 54 and U2, D2 for quad 55, respectively. Since the motor can only be rotated in one direction at a time, the use of two "one and only one" circuits for each count line has been consolidated into one such circuit 57 for the two slave motor pulse lines and another 58, for the two master motor pulse lines, by using digital switching as shown in FIG. 4. The one and only one circuits produce one pulse for each two clock input pulses. The synchronized pulse is started and finished only on the positive or negative edge of the clock pulse $\phi1$ or $\phi2$ derived from the clock circuit 56. Whether the positive or negative edge is used depends on the type of synchronizer used. In the exemplary system we assume the positive edge is used. Therefore, if the second clock output $\phi2$ is inverted as shown in FIG. 3, the second one and only one circuit triggers on the negative edge of the original clock pulse $\phi1$. The gives a 180° offset to the pulses. When mixed in an "exclusive or" gate two overlapping pulses would be counted as two pulses, rather than as one. In order to feed the proper input command to an up/down counter for it to provide an accurate count, no pulses may overlap or there will be an invalid count. The edge detectors 61 and 62 in the mixer section 39 seen in FIG. 4 prevents this ovelapping and provides a valid synchronized input to the up/down counter 40. The function of the edge detectors is to eliminate any overlapping pulses on opposite lines. The edge detector 61, 62 are "one shot" circuits that trigger on the negative edge of the input waveform ACU and ACD seen in FIG. 8. The output of 61, 62 (waveforms CU and CD in FIG. 8) is much shorter than the input to insure that no pulses overlap as this would be an invalid input to counter 40.

Figure 5:
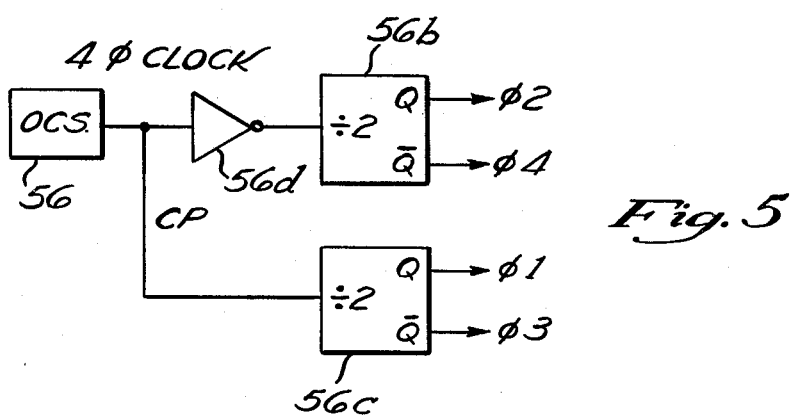
FIGS. 5 and 6 are a block diagram and wave-form diagram of a 4 phase system clock for the use with the system of FIGS. 7 and 9.
Figure 6:
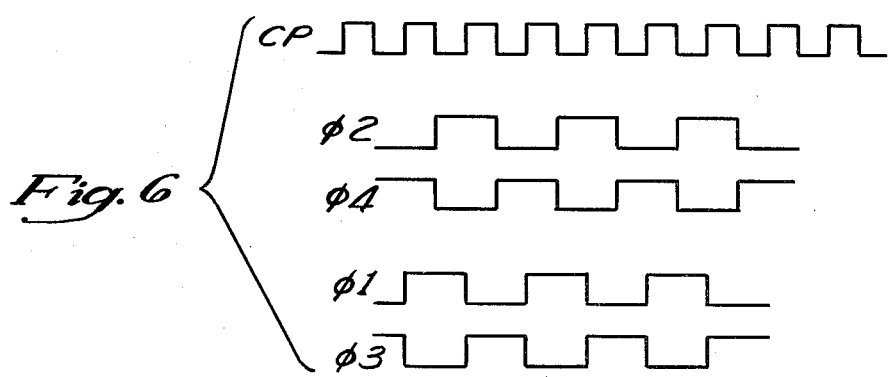
Figure 7:
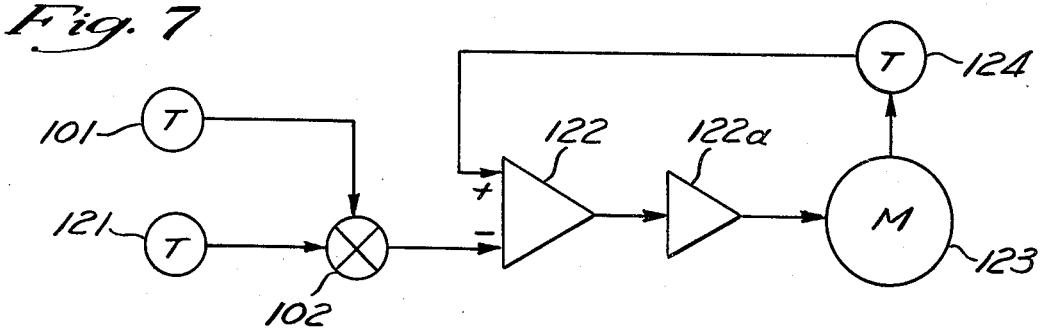
FIG. 7 is a block diagram of a DC servo with an additional input to deliver a sum or difference input to the slave motor in order to add or subtract rotations or frames from a running system.

The pulse width of clock output CP (FIG. 8) is determined by the frequency of the output of clock 56. The constant width pulses CP (seen in FIG. 8) are applied directly to circuit 57 and, through inverter 56a to circuit 58 in FIG. 3. This system thus uses a two phase clock wherein phase 2 is simply phase 1 inverted. A four phase clock for use in systems such as those to be discussed below in connection with FIGS. 7 and 9 is shown in FIGS. 5 and 6. Here, as seen in FIG. 5, the output of clock 56 is applied to inverter 56d and to a "divide by 2" circuit 56c. The output of inverter 56a is applied to a second "divide by 2" circuit 56b. Circuits 56b and 56c each have two opposite polarity outputs which are respectively phases $\phi2$, $\phi4$, and $\phi1$, $\phi3$ of the four phase clock as seen in FIGS. 5 and 6. The outputs U1, U2, D1 and D2, derived from clock 56 by the circuitry of FIG. 3 are applied as inputs to the circuitry of FIG. 4, as shown by the corresponding reference characters. These same signals are also applied as inputs to the digital mixer 39 as seen in FIG. 4. It is, of course, at this point of division of the output of synchronizer 38 that the branching into the first and second order feedback loops occurs, the digital mixer 39 receiving outputs from 38 and forming a part of the second order feedback loop and the electronic tachometers 42, 43 also receiving output from 38 and forming a part of the first order feedback loop. Positive pulses on U1 generate negative pulses at T1, the output of a first differential amplifier 63 in electronic tachometer 43. Similar comments apply to the output T2 of differential amplifier 64 in electronic tachometer 42. The pulses at T1 are fed into an integrator 65 with DC feedback in order to generate an output voltage related to the input pulse frequency to provide the electronic tachometer function. Since the pulse widths are the same regardless of inputs, and if the absolute voltage magnitude of the pulses (representing the height of the pulse in a pulse diagram) is kept equal, then this circuit is a bi-polar frequency to voltage converter. Both electronic tachometers 42 and 43 are driven from the same clock and the drive voltages for U1, D1, U2 and D2, are very close to the same voltages with the C-MOS circuitry used, so the electronic tachometers are almost identical and track very closely. This system insures that tracking error will be small in the analog or first loop section of the interlock. Even so, the electronic tachometers will drift, so the output from the digital to analog converter 41, which is a voltage representing the digitally measured instantaneous error between the two motor speeds, is mixed with the output of the first integrator 65 in the mixer 37 comprising integrator 65. When the pulse rates are equal, the counter 40 will still toggle one count. Feeding the output of the digital to analog converter 41 through both the integrator 65 in mixer 37 and the integrator 32b in the differential amplifier 32 will smooth out this toggle. The need for the integrator 65 in mixer 37 is not obvious but is three-fold. First, if the outputs T-1 and T-2 were mixed directly, there would be a resultant beat frequency which would cause jitter in the output, causing a rough output when the system is in lock. Secondly, if the remote drive encoder 35 has jitter, the first integrator 65 will filter it. Third, the DC stability of this sytem, by its nature, must be quite good. By feeding the output of one operational amplifier 63 into the inverting input of a second operational amplifier 65 and setting the gain of the second so that the drift of the first is cancelled, and by fabricating these amplifiers on the same substrate of semiconductor material, the temperature stability is good over a very wide range. With good stability, the electronic section can be used to replace DC tachometers with good results.

Figures 8A, 8B, 8C:
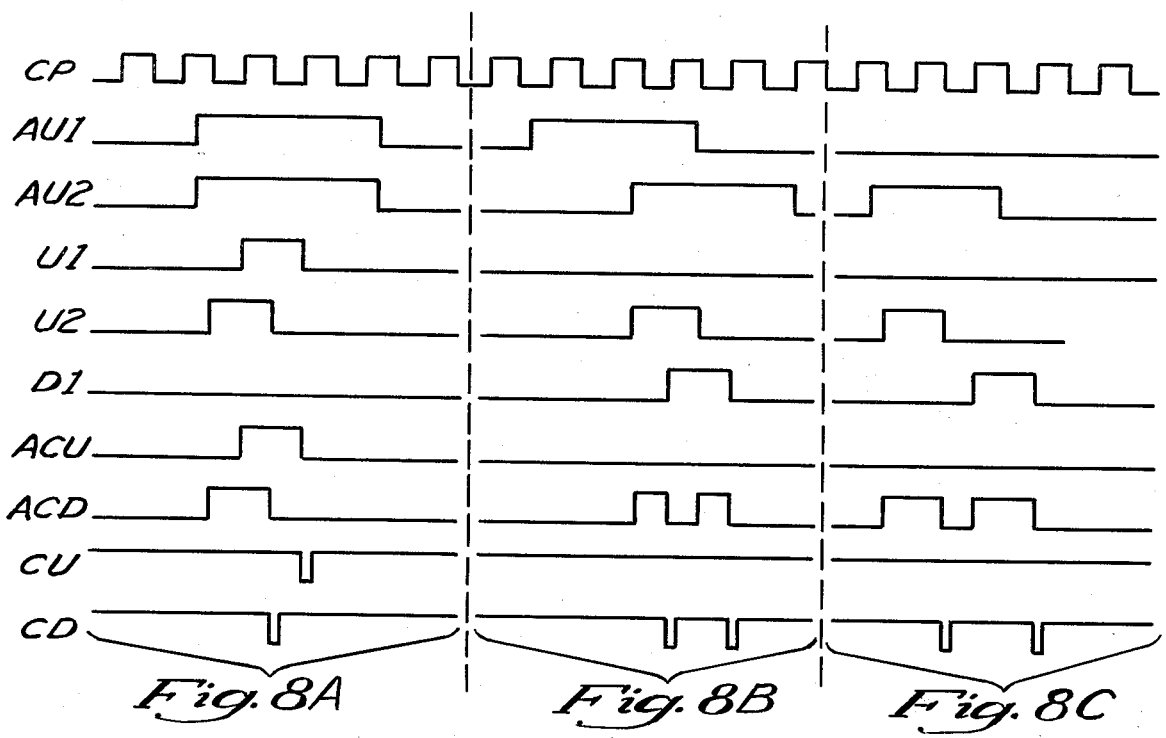
FIGS. 8A, 8B, and 8C are voltage wave forms illustrating pulse trains generated by the system of FIGS. 2, 3 and 4.
Figure 9:
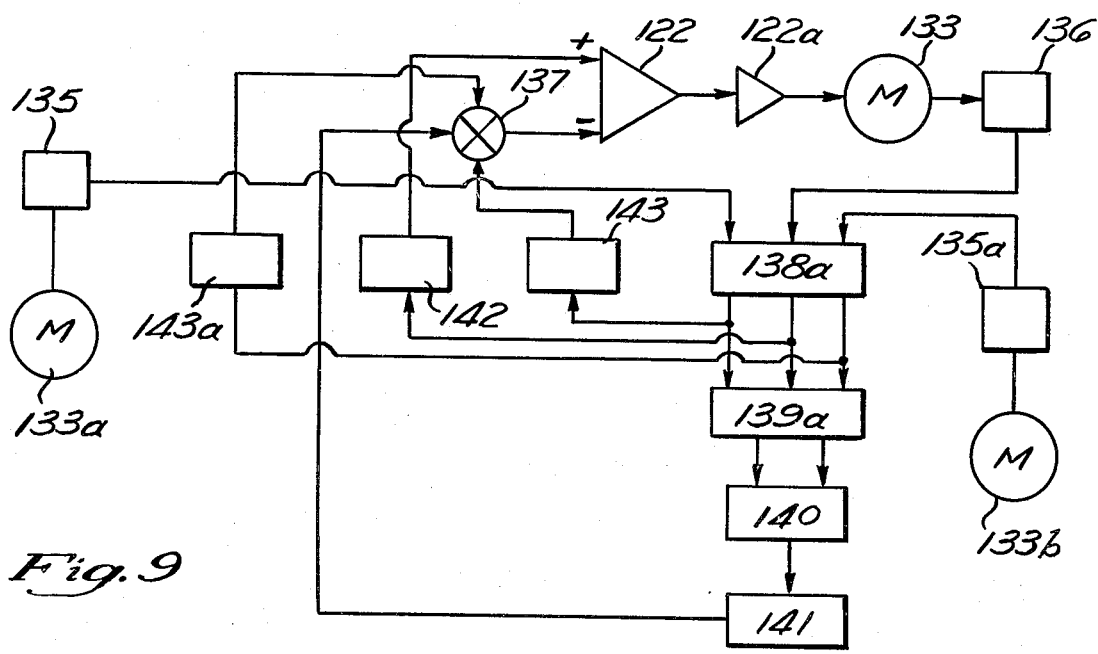
FIG. 9 is a system block diagram similar to FIG. 2 and illustrating the use of an additional input of the type shown in FIG. 7 in such a system.
Figure 4:
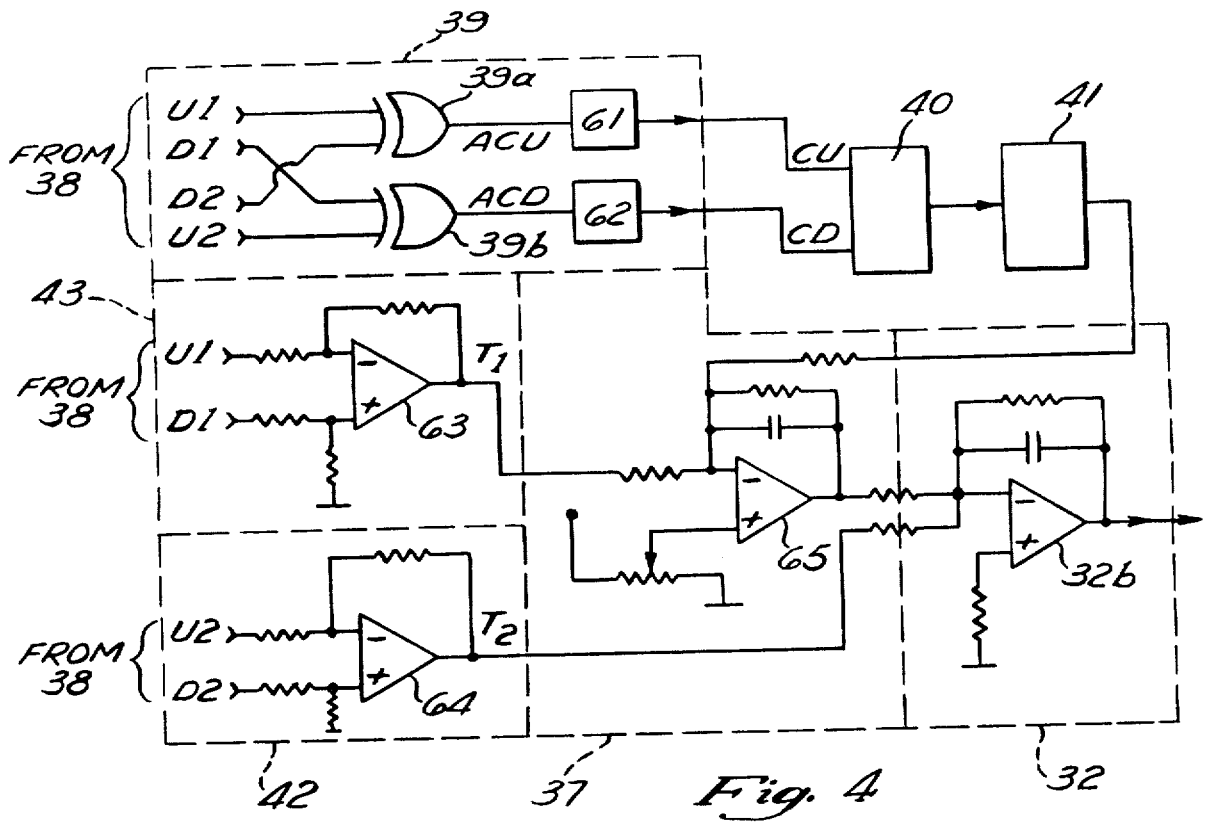
Figure 5:
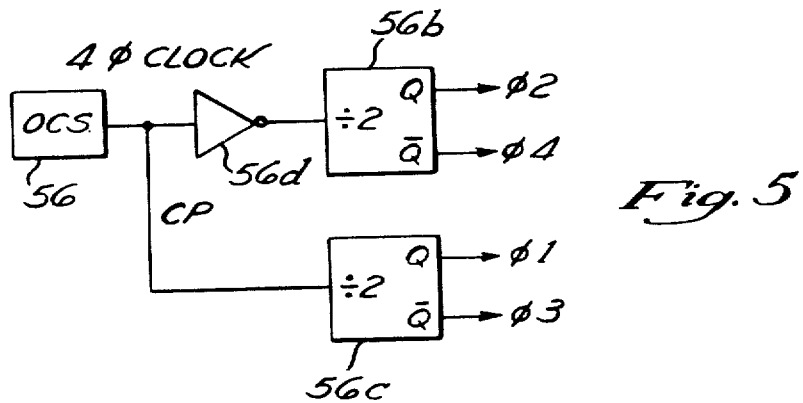
Figure 6:
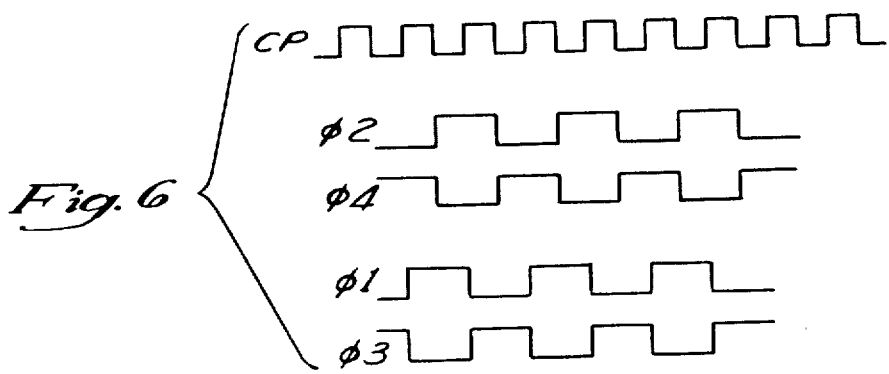

FIG. 8 is a detailed pulse diagram of wave forms occurring at various points in the system. The first wave form, CP, is that of the output of the basic system clock 56 from which other clock phases are derived, either by inversion for the two (2) phase system of FIGS. 3 and 4 or by circuitry as shown in FIGS. 5 and 6. The continuous clock pulse shown in FIG. 8 is divided by vertical dashed lines to form FIGS. 8(a), 8(b), and 8(c) to illustrate three (3) possible different cases for interaction of pulses AU1 and AU2 in the system of FIGS. 3 and 4. Pulse wave form AU1 is a decoded by unsynchronized up-pulse from the master encoder 35. Pulse AU2 is a decoded but unsynchronized up-pulse from the slave encoder 36.

Pulse U1 is a master up-pulse synchronized to the wave form CP which is here taken to be phase 1 of the two (2) phase clock. Phase 2 (not shown) is simply the inverse of CP. Pulse wave form U2 is a slave up-pulse synchronized to clock phase 2. Wave form D1 is a master down-pulse synchronized to phase 1. Wave form ACU is the up output of the digital mixer 39a seen in FIG. 4. Pulse wave form ACD is the down-output of the digital mixer 39b seen in FIG. 4. CU is the up-output of the edge detector 61. Wave form CD is the down-output of the edge detector 62.

The portion of the wave form seen in FIG. 8a illustrates the case where two (2) pulses coincide as seen in that portion of the wave forms of AU1 and AU2, which are in FIG. 8a. In this case, the resultant synchronized pulses U1 and U2 are locked to CP1 and CP2, respectively. These pulses are used to trigger edge detectors 61 and 62. The resultant pulses, CU and CD are then valid pulses for the counter chain or input to counter 40.

That portion of the wave forms shown in that portion of the diagrams lying in FIG. 8b illustrates the case where two (2) pulses lock to different phases of the clock U1 and D2 are fed to the same mixer thus producing the resultant wave form shown on the line ACD in the section 8d portion of the wave diagram. The two resulting shorter pulses are then edge detected and sent to the counter 40.

The portion of the wave form shown in FIG. 8(c) of the diagram illustrates the case where two (2) pulses with wider spacing are fed to the mixer 39.

The system is, by no means, limited to one master and one slave motor, as has been described above. As seen in FIGS. 7 and 9, a second master shaft or motor can be mixed with the first shaft or motor giving a resultant rotation equal to the sum or difference of the rotational frequencies of the two master shafts. In general, elements in FIG. 7 which correspond to analogous elements in FIG. 2 are indicated by reference characters which have been increased by 100 with respect to the reference characters used in FIG. 2. Thus, the tachometer 21 driven by a first master shaft in FIG. 2 is represented in FIG. 7 by the element 121. Similarly, differential amplifier 22 becomes amplified 122, power amplifier 22a becomes power amplifier 122a, slave motor 23 becomes slave motor 123, and slave tachometer 24 becomes slave tachometer 124. The second tachometer or motor shaft input is indicated in FIG. 7 by the element 101 which is mixed with the output of 121 by mixer 102.

In practice, the purpose of an additional input is to add or substract frames from a running or stopped film system. It is often necessary to slip the synchronization of individual tracks in order to find the exact synchronization point between film and sound. This is needed, if while doing a mix, an error has been made. It then becomes necessary to slip film ahead or behind in order to find the exact synchronization point. If the system can continue to run, then it is much easier to find the exact synchronization point. Furthermore, if the error is indicated on a read-out then the system can be put back into synchronization after the out of sync section has been mixed to the master track.

Other uses or digitally mixing two or more frequencies are found in differential frequency counters to read a resultant frequency between several inputs. For example, a communication receiver with several conversion stages could use such a device. Accurate speed modification of a running servo system, by adding or subtracting pulses that have been derived from the master, is another example. For example, the film speed in Europe is 25 frames per second, and in the United States the film speed is 24 frames per second. If two (2) pieces of film of different speeds were to be viewed together in synchronization, a method of modifying the speed of the slave motor would have to be devised. This can be accomplished by taking the master pulse rate which is running at 24 frames per second and dividing that rate by 24 and adding the extra pulse to the slave pulse rate, thus increasing the slave speed to 25 frames per second. Another use would be to match film editing tables of different manufacturers without mechanical modification. An example would be the motor in Table A turning at 4.8 frames per revolution and that in Table B turning at 5 frames per revolution. The standard pulse rate is 50 pulses per frame. One way to match speeds is to have different pulse rate shaft encoders. Another way is to electronically add or subtract pulses that are related to the shaft encoders by means of circuitry such as that illustrated in the basic block diagram of FIG. 7.

It will be noted that FIG. 7 is a DC servo system, with an additional input 101, to deliver a sum or difference input to the slave motor 123. When tachometer 121 is turning, slave motor 123 will follow it in accordance with the reasoning discussed in connection with FIG. 1. With the addition of tachometer 101 and mixer 102, it is possible to add or subtract revolutions from the system, either while running or while at rest. Obviously, in this system if all of the components are not equal, there will not be accurate synchronization. To get accurate synchronization, a second digital feedback loop as outlined in FIGS. 2 and 9 must be added.

FIG. 9 bears a relationship to FIG. 7 similar to that which FIG. 2 bears to FIG. 1. Also, the reference characters in FIG. 9 which are analogous to the reference characters used in FIG. 2 have again been increased by 100. From the drawing, it will be seen how the circuit of FIG. 2 can be expanded to include a third (or more) input such as 133b to add or subtract accurately from the system. It should be noted that input 133b in FIG. 9 corresponds to the generalized additional input 101 in FIG. 7 for the reason that 101 may indicate more than one additional input. Similarly, the mixer 138a in FIG. 9 corresponds to the generalized mixer 102 in FIG. 7.

The circuit of FIG. 9 has an expanded decodersynchronizer 138a which uses a three phase clock. This allows the third input to be synchronized to the system clock so that three separate pulse rates can be mixed and counted to obtain accurate synchronization between inputs. In FIG. 9, mixer 138a is a mixer similar to mixer 39 in FIG. 2, but with one more input per channel. Other additional parts include a third electronic tachometer 143(a) and an additional input to mixer 137. There is also an additional shaft encoder 135a driven by the additional motor 133b. In the working system, shaft encoder 135a can be replaced by a pulse generator and separate up-down lines. A four-phase clock as shown in FIG. 6 is used to enable counts to be added and subtracted simultaneously.

It thus is seen that the systm can be provided not only with a high degree of precision, but also with a high degree of flexibility.

I claim:

1. A servo system for interlocking the rotation of a slave motor to that of a master motor, comprising:
    (a) first and second means for deriving first and second digital signal pulse trains, each having a characteristic respectively representative of the speed of rotation of said master motor and said slave motor, and each having encoded directional information representative of the direction of rotation of said master and slave motor, respectively;
    (b) quadrature decoder means for decoding said directional information to feed first and second pairs of up-down pulse lines;
    (c) first order feedback loop means for controlling the speed and direction of rotation of said slave motor comprising first and second means each receiving pulses from one of said up down pulse line pairs for converting each of said first and second digital pulse trains, respectively, to first and second analog voltage signals, and differential amplifier means for combining said analog signals as inputs to produce an error signal output proportional to the sum or difference between said analog signals in the absence of any other signal for controlling the speed and direction of rotation of said slave motor; and
    (d) second order feedback loop means connected for controlling the speed and direction of rotation of said slave motor connected in parallel to said first order feedback loop and comprising means including a digital mixer taking its input from said quadrature decoder means and up-down counter means for continuously digitally determining the sum or difference between said characteristic of said first and second digital signal pulse trains and for continuously producing a third digital signal representative of said sum or difference, means for converting said third digital signal to a third analog signal or magnitude proportional thereto, and of polarity determined by said digital mixer, and means for mixing said third analog signal with one of said first or second analog signals to produce a combined input to said differential amplifier means.

2. A system as in claim 1 and further including:
    (a) third means for deriving a third directionally encoded digital signal pulse train having a characteristic representative of the speed of rotation of a second master motor; and
    (b) means for combining said third pulse train with said first pulse train for controlling the speed of rotation of said slave motor responsively to the sum or difference of the rotational speeds represented by said first and third pulse trains.

3. A system as in claim 1 wherein said first order feedback loop means for controlling the speed and direction of rotation of said slave motor comprises:
    (a) a system clock for controlling a pulse synchronizer-quadrature detector circuit which receives said first and second digital signal pulse trains as its input;
    (b) first and second bi-polar electronic tachometers, each receiving first and second outputs from said synchronizer-detector circuit, each of said bi-polar electronic tachometers comprising integrated amplifier-pair means for differentially comparing said first and second digital inputs and for producing a voltage proportional to the difference between said inputs; and
    (c) mixer circuit means for receiving the output of one of said bi-polar electronic tachometers and for receiving the output of said second order feedback loop means, the output of said mixer means being applied as one input to said differential amplifier means.

4. A system as in claim 3 wherein said mixer means comprises an integrating differential amplifier means which in turn comprises a differential amplifier connected to function as an integrator.

5. A system as in claim 3 wherein said second order feedback loop means for controlling the speed and direction of rotation of said slave motor comprises:
    (a) up-down counter circuit means including digital mixer means for receiving the output from said pulse synchronizer-quadrature detector circuit and for producing a train of digital output signal pulses representative of the sum or difference between said first and second digital signal pulse trains; and
    (b) digital to analog converter means connected to receive the output from the up-down counter means and to convert it to said third analog voltage signal which is applied as an input to said differential amplifier means.

6. Apparatus for bi-directionally interlocking two or more shaft rotating systems to interlock the rotation of one or more slave shafts with one remote master shaft, said apparatus comprising:
    (a) an individual differential amplifier means having its output connected for controlling the speed and direction of rotation of each one of said slave shafts respectively;

(b) means for generating a first output of digital pulses having a characteristic representative of the actual instantaneous speed of rotation of said one slave shaft and having simultaneous directional information encoded therein;

(c) means for generating a second output of digital pulses having a characteristic representative of the actual instantaneous speed of rotation of said remote master shaft and having simultaneous directional information encoded therein;

(d) quadrature decoder means for decoding said directional information to feed first and second pairs of up-down pulse lines;

(e) means taking its input from the first of said up-down pulse line pairs for deriving a first analog voltage having a magnitude proportional to said characteristic of said first output of digital pulses and a polarity determined by said directional information encoded in said first output, said first analog voltage being connected as at least a part of a first input to said differential amplifier means;

(f) means taking its input from the second of said up-down pulse line pairs for deriving a second analog voltage having a magnitude proportional to said characteristic of said second output of digital pulses and a polarity determined by said directional information encoded in said second output, said second analog voltage being connected as at least a part of a second input to said differential amplifier means;

(g) means including digital mixer means taking its input from said quadrature decoder means and up-down counter means for deriving a third analog voltage having a magnitude proportional to the sum or difference between said directionally encoded characteristic of said first output of pulses and said directionally encoded characteristic of said second output of pulses; and (h) means for mixing said third analog voltage with one of said first or second analog voltages to form therewith a composite input to said differential amplifier, said mixing means connecting said third analog voltage to said differential amplifier in a second order error correcting feedback loop parallel to the two branch first order feedback loop comprising said means for deriving and connecting said first and second analog voltages respectively to said differential amplifier, said two branch first order loop maintaining a basic bi-directional interlock between the speed and direction of rotation of said slave shaft and said remote master shaft and said second order loop maintaining a digitally controlled precise bi-directional interlock therebetween.

7. A system as in claim 6 and further including:
means for combining with said second train of digital pulses having a characteristic representative of the instantaneous speed of rotation of said remote master shaft, a third directionally encoded train of digital pulses having a characteristic representative of the actual instantaneous speed of rotation of a second remote master shaft for providing a resultant signal proportional to the sum or difference of the speeds of rotation of the two master shafts.

8. An apparatus as in claim 6 wherein said means for generating a first train of digital pulses comprises encoder means driven by said slave shaft for producing a quadrature encoded output of digital pulses having a pulse frequency proportional to the actual instantaneous angular frequency of said slave shaft.

9. An apparatus as in claim 6 wherein said means for deriving said first analog voltage comprises synchronizer-quadrature detector circuit means for receiving the output of said encoder means and electronic tachometer means for receiving the output of said synchronizer-detector means, said electronic tachometer means comprising bi-polar/directional frequency-to-voltage converters.

10. Apparatus as in claim 6 wherein said means for generating said second train of digital pulses comprises encoder means driven by said remote master shaft for producing a quadrature encoded output of digital pulses having a frequency proportional to the angular speed of rotation of said remote master shaft.

11. Apparatus as in claim 6 wherein said means for deriving said second analog voltage comprises synchronizer-quadrature detector circuit means for receiving said second train of pulses and providing an output to a second electronic tachometer which, in turn, has its output connected to said differential amplifier, said second electronic tachometer comprising bi-polar/directional frequency-to-voltage converter means.

12. Apparatus as in claim 6 wherein said means for deriving said third analog voltage comprises up-down circuit means connected to receive signals derived from said first and second trains of pulses and to provide a digital output signal proportional to the difference between the frequencies of said first and second trains of pulses, said output signals being connected to a digital-to-analog converter having its output in turn combined with one of said first or second analog voltages applied to said differential amplifier means.

13. Apparatus as in claim 6 wherein said means for mixing said third analog voltage with one of said first and second analog voltages includes an integrating differential amplifier circuit which in turn comprises a differential amplifier connected to function as an integrator.

14. A bi-directional servo system for interlocking the rotation of a slave motor to that of a master motor, comprising:

(a) first and second means for deriving first and second digital signal pulse outputs, each having a characteristic respectively representative of the speed of rotation of said motor and said slave motor, and each having encoded directional information;

(b) quadrature decoder means for decoding said directional information to feed first and second pairs of up-down pulse lines;

(c) first order feedback loop means for controlling the speed and direction of rotation of said slave motor comprising first and second tracking electronic tachometer means taking its inputs from said quadrature decoder means for converting each of said first and second digital signal pulse outputs respectively, to first and second analog voltage signals;

(d) second order overshoot correcting feed-back loop means connected for controlling the speed and direction of rotation of said slave motor connected in parallel to said first order feedback loop and comprising means including digital mixer means taking its input from said decoder means and up down counter means for continuously digitally determining the sum or difference between said characteristic of said first and second digital pulse trains and for continuously producing a third digital signal representative of said sum or difference and means for converting said third digital signal to a third bi-polar analog signal of magnitude proportional thereto, and of polarity determined by said digital mixer; and (e) means for mixing said first, second and third bipolar analog signals to produce a combined error signal for controlling the speed and direction of rotation of said slave motor.

15. A bi-directional servo system for interlocking the rotation of a slave motor to that of a master motor, comprising:

(a) first and second means for deriving first and second digital signal pulse outputs, each having a characteristic respectively representative of the speed of rotation of said motor and said slave motor, and each having encoded directional information;

(b) quadrature decoder means for decoding said directional information to feed first and second pairs of up-down pulse lines;

(c) first order feedback loop means for controlling the speed and direction of rotation of said slave motor comprising first and second tracking electronic tachometer means taking its inputs from said quadrature decoder means for converting each of said first and second digital signal pulse outputs, respectively, to first and second analog voltage signals, and differential amplifier means for combining said analog signals as inputs to produce an error signal output proportional to the sum or difference between said analog signals in the absence of any other signal for controlling the speed and direction of rotation of said slave motor; and (d) second order overshoot correcting feedback loop means connected for controlling the speed and direction of rotation of said slave motor connected in parallel to said first order feedback loop and comprising means including a digital mixer taking its input from said quadrature decoder means and up down counter means for continuously digitally determining the sum or difference between said characteristic of said first and second digital pulse outputs and for continuously producing a third digital signal representative of said sum or difference, means for converting said third digital signal to a third bipolar analog signal of magnitude proportional thereto and of polarity determined by said digital mixer, and means for mixing said third analog signal with one of said first or second analog signals to produce a combined input to said differential amplifier means.

16. The bi-directional servo system of claim 15 wherein said first and second means for deriving first and second digital signal pulse outputs are digital shaft encoders with quadrature output.

17. The bi-directional servo system of claim 15 wherein said tachometer means for converting each of said first and second digital pulse outputs, respectively, to first and second analog voltage signals comprise first and second differential amplifiers differentially receiving as inputs said first and second pair of up-down pulse lines, respectively for deriving a first and second bi-polar pulse output, respectively; and wherein said differential amplifier means for combining said analog signals also comprise first and second integrator means, respectively, receiving said first and second bipolar pulse outputs for deriving said first and second bipolar analog voltage signals.

18. The bi-directional servo system of claim 15 further comprising:

a system clock;
first and second synchronizer means for synchronizing said first and second pulse outputs to different phases of said system clock to make said pulses non-overlapping and referencing the width of each of said pulses to said system clock thus creating pulses of uniform duration prior to conversion thereof to analog voltages by said tracking tachometers.

19. The bi-directional servo system of claim 15 wherein said digital mixer comprises gate means connected to said up-down counter so as to cause addition of said first and second pulse outputs by said counter if said encoded directional information is indicative of incorrect rotation of said slave motor relative to said master motor and to cause said counter to compute the difference between said pulse outputs if said encoded directional information is indicative of correct direction of rotation of said slave motor relative to said master motor.

20. The bi-directional servo system of claim 15; said digital mixer comprising a pair of two-input exclusive-or gates, the output of one gate being connected to the up count input of said up-down counter and the output of the other gate being connected to the down count input of said up-down counter, each gate having one input connected to one said up line and one input connected to one said down line said one up line not belonging to the same up-down pair as the said one-down line.

21. The bi-directional servo system of claim 15 wherein said differential amplifier means in said first order feedback loop means are connected for algebraically subtracting said first and second analog voltage signals such that the magnitude of said voltages is summed if their polarities are opposite to each other and is subtracted if their polarities are equal.

22. The bi-directional servo system of claims 15 and 18 wherein the tracking electronic tachometers comprise integrated amplifier pairs, each pair sharing a common semi-conductor substrate for improved thermal stability.

23. The bi-directional system of claims 18 and 22, wherein pulse synchronizers and said electronic tachometers are all referenced to the same drive voltage to create pulses of equal voltage so that said electronic tachometers are nearly identical and track very closely.

* * * * *

UNITED STATES PATENT AND TRADEMARK OFFICE
CERTIFICATE OF CORRECTION

PATENT NO. : 4,227,126
DATED : October 7, 1980
INVENTOR(S) : Henry M. Jenecke

It is certified that error appears in the above—identified patent and that said Letters Patent is hereby corrected as shown below:

Sheet 2 of the drawings should be deleted to appear as per attached sheet 2.

Signed and Sealed this

Thirteenth Day of January 1981

[SEAL]

*Attest:*

*Attesting Officer*

SIDNEY A. DIAMOND

*Commissioner of Patents and Trademarks*